No. 12,246

REISSUED JULY 26, 1904.

N. F. AMBURSEN.

DAM.

APPLICATION FILED MAY 31, 1904.

2 SHEETS—SHEET 1.

Witnesses:
P. H. Pezzetti
E. Batchelder

Inventor:
N. F. Amburssen.
by Wright Brown & Quinby
Attorneys.

No. 12,246. REISSUED JULY 26, 1904.

N. F. AMBURSEN.

DAM.

APPLICATION FILED MAY 31, 1904.

2 SHEETS—SHEET 2.

Witnesses:
C. W. Pizzetti
E. Bartfield

Inventor:
N. F. Amburseu
by Wright Brown & Quinby
Attorneys.

No. 12,246. Reissued July 26, 1904.

UNITED STATES PATENT OFFICE.

NILS FREDRICK AMBURSEN, OF WATERTOWN, NEW YORK.

DAM.

SPECIFICATION forming part of Reissued Letters Patent No. 12,246, dated July 26, 1904.

Original No. 734,796, dated July 28, 1903. Application for reissue filed May 31, 1904. Serial No. 210,434.

*To all whom it may concern:*

Be it known that I, NILS FREDRICK AMBURSEN, a citizen of the United States, residing at Watertown, in the county of Jefferson and State of New York, have invented certain new and useful Improvements in Dams, of which the following is a specification.

The invention relates to certain improvements in the construction of dams, and has for its principal object to construct a gravity dam, weir, or reservoir composed of concrete and steel, which may be used in place of dams of solid masonry at smaller expense, the cost of both materials and labor being materially reduced.

A further object of the invention is to provide a dam having a flooring arranged at such an angle as to take advantage of the pressure of water to assist in holding the dam in place and prevent sliding movement from the horizontal thrust of the water, the flooring being inclined and slightly curved in such manner as to throw all the pressure of the water well within the lines of the dam-supports, increase in the depth of the water proportionately increasing the weight on the dam and tending to more firmly hold the same in place.

A further object of the invention is to provide a construction of dam composed wholly of concrete strengthened by iron or steel and in which the metal is entirely embedded in the concrete and all danger of oxidation prevented, the dam requiring no attention whatever after the building operation is completed.

A further object of the invention is to provide an improved form of anchor for holding the dam in place against pressure in a horizontal direction.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
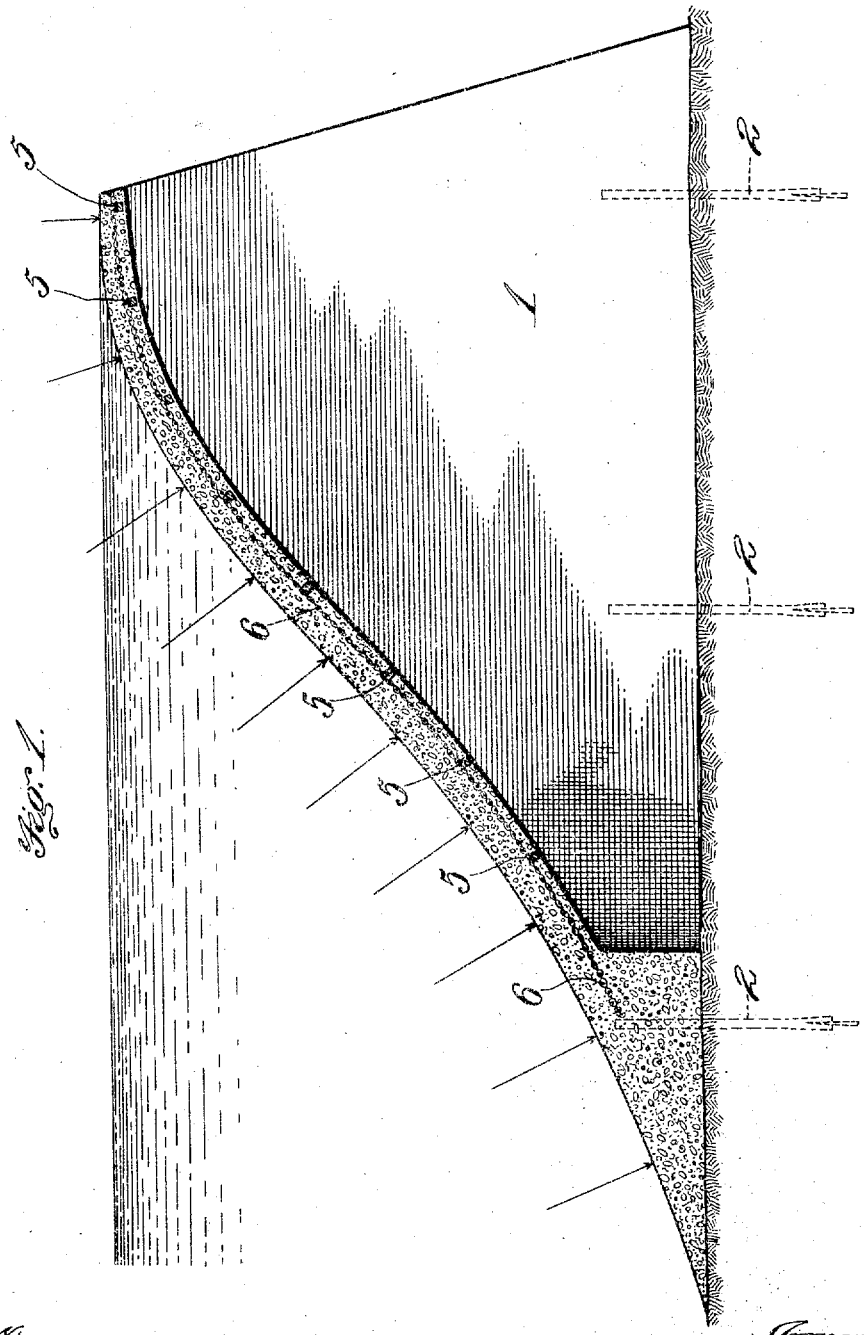
Figure 3:
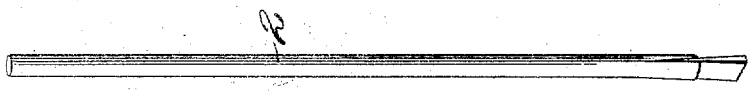
Figure 2:
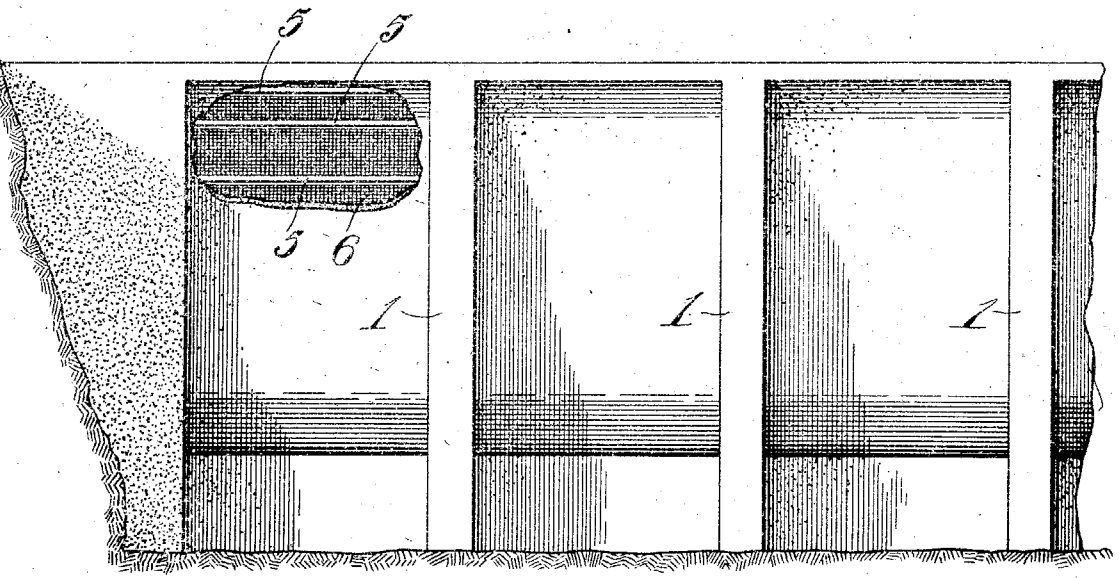

In the accompanying drawings, Figure 1 is a transverse sectional elevation of a dam constructed in accordance with my invention. Fig. 2 is an elevation of the same, a portion of the flooring being broken away in order to more clearly illustrate the arrangement of the metallic tension-rods and expanded metal or wires to assist in holding the flooring in place. Fig. 3 is a detail perspective view of one of the anchoring pins or bolts.

Similar numerals of reference are employed to indicate corresponding parts throughout the several figures of the drawings.

In carrying out the invention I erect a large number of buttresses 1 on lines parallel with the direction of flow of the water, these buttresses being formed of concrete and having straight parallel sides, the rear walls of the buttresses being inclined at a suitable angle in order to the better resist the pressure of the water. The buttresses are anchored in place by vertically-disposed iron pins 2, placed in openings bored in the rock or other foundation and extending for approximately half the length into the buttresses. The lower end of each of the pins is split, as shown more clearly in Fig. 3, and in the split portion is inserted a thin edge of an iron wedge, so that after the pin is lowered in place in the opening it may be driven down and the lower end of the pin spread and locked against the walls of the opening. This forms a secure anchor for the buttresses and prevents sliding of the dam under horizontal pressure of the water.

As the principal object of the invention is to provide as a substitute for a dam of solid masonry a construction composed of concrete and metal so disposed as to reduce the cost both of material and labor, I construct the flooring of the dam as a relatively thin inclined shelf superimposed upon the buttresses and overhanging or projecting over a considerable portion of the base, as shown in Fig. 1.

In the flooring of the dam are a number of equidistantly-spaced iron rods 5, which extend the whole length of the dam and act as tension members to strengthen the flooring and resist the pressure of the water thereon. The flooring is further strengthened, and a supporting-base for the concrete is formed by the employment of sheets of expanded metal 6, placed on top of the tension-rods, or twisted wire or heavy woven wire may be employed as a substitute for the expanded metal. The said sheets 6 serve to prevent the formation of cracks in the concrete flooring, such as might be caused by contraction of the concrete if the sheets 6 were omitted. All portions of the metal are covered by the concrete, there being no metal-work exposed, and the dam requiring no care or attention whatever after the building operation is completed.

It will be noted that the buttresses are wholly protected from the water by the flooring, so that no ice, logs, or debris passing over the dam can accumulate between the buttresses and, being jammed, tend to destroy the structure.

Other objects of the invention being to take advantage of the weight of the water to assist in holding the dam in position and to arrange the lines of pressure wholly within the limits of the buttresses without providing an extensive base area, the flooring of the dam is arranged on a reversely-curved line and preferably at the lower portion of the dam on an inclined line tangential to the concaved or downwardly-extending curve. This arrangement at the foot of the dam throws the principal weight at the lower portion of the dam, where it belongs, and tends to anchor the dam in place, and it will be noted that on the convex curve the lines of pressure perpendicular to the flooring converge toward the horizontal base-line. At the upper portion of the dam the curve is convex, so that the lines of pressure perpendicular to the flooring will converge toward the horizontal line of the base, and thus throw all the lines of pressure within a horizontal base-line of restricted area. The curved line is clearly illustrated in the drawings, and in order to avoid repetition in the claims the shorter terms "concave curve" and "convex curve" have been used to designate the shape of the surfaces at the lower and upper portions, respectively, of the flooring.

It will be noted that the dam is of substantially triangular form in cross-section, the lines of the base and flooring being of substantially equal extent, so that the floor-line will project but a limited distance beyond the vertical plane in which the crest of the dam is disposed. This construction, in connection with the reversely-curved line of the dam-flooring, permits lines of force and pressure perpendicular to the face of the flooring to fall within the limits of the base-line, so that the weight of the water acts positively to hold the dam in position.

A dam built in accordance with this invention has all the advantages of a solid-masonry dam without the expense of time and materials incident to its construction, as well as reducing the cost of labor, the concrete being molded on the spot without the employment of specially-skilled labor.

Having thus described the invention, what is claimed is—

1. A dam comprising a base, an inclined concrete flooring overhanging the base, and metallic reinforcing members embedded in the flooring and extending lengthwise thereof.

2. A dam comprising a base, an inclined concrete flooring overhanging the base, a plurality of spaced buttresses interposed between the base and flooring, and metallic reinforcing members embedded in the flooring and extending lengthwise thereof and across the buttresses.

3. A dam comprising a base, spaced buttresses rising therefrom, and a relatively thin inclined concrete flooring supported by and overhanging the buttresses and base, said flooring having metallic reinforcing members extending lengthwise of the flooring and across the buttresses.

4. A dam comprising a base, an inclined concrete flooring overhanging the base, the lines of the base and flooring, transversely considered, being of substantially equal extent, so that the lines of pressure perpendicular to the face of the flooring shall fall within the limits of the base, and metallic reinforcing members embedded in the flooring and extending lengthwise thereof.

5. In dam construction, a plurality of spaced buttresses having parallel perpendicular walls, a flooring supported by the buttresses, metal tension-rods embedded in the flooring and extending lengthwise thereof, and reticulated metal also embedded in the flooring and forming a partial support therefor, substantially as specified.

6. A dam of substantially triangular form in cross-section in which the widths of the flooring and base lines are substantially of equal extent, the flooring being arranged on a reversely-curved line in order to throw the lines of pressure perpendicular to its face wholly within the limits of the base.

7. In dam construction, a flooring having its upper portion arranged on a convex curve to thereby distribute the lines of pressure perpendicular to the face of the floor wholly within the base-line of the dam, the floor and base lines, transversely considered, being of substantially equal extent and the outer line of the base extending but a limited distance beyond the vertical plane in which the crest of the dam is disposed.

8. In dam construction, a dam having the lower portion of its flooring arranged on a concave line to thereby throw a greater portion of the weight of the water toward the lower portion than to the upper portion of said dam.

9. In dam construction, a dam-floor arranged on a reversely-curved line, the curve at the lower portion of the floor being concave, and that at the upper portion of said floor being convex.

10. In dam construction, a plurality of spaced buttresses formed of concrete, anchor-pins embedded partly in the foundation and partly in the buttresses, and a flooring formed partly of concrete and partly of metal tension-rods embedded in the concrete, said flooring being arranged on a partly-curved and partly-inclined plane, so that the lines of pressure perpendicular to the face of the floor shall lie wholly within the limits of the base of the buttresses, the outer ends of the buttresses projecting but a limited distance beyond the vertical plane in which the crest of the dam is disposed.

In testimony whereof I have affixed my signature in the presence of two witnesses.

NILS FREDRICK AMBURSEN.

Witnesses:
EARLE W. SAYLER,
F. W. KELLOGG.